US012098969B2

(12) United States Patent
George

(10) Patent No.: US 12,098,969 B2
(45) Date of Patent: Sep. 24, 2024

(54) IMAGING SYSTEM FOR RECORDING IMAGES OF BEARING RACEWAYS

(71) Applicant: AKTIEBOLAGET SKF, Gothenburg (SE)

(72) Inventor: William George, Ypsilanti, MI (US)

(73) Assignee: AKTIEBOLAGET SKF, Gothenburg (SE)

(*) Notice: Subject to any disclaimer, the term of this patent is extended or adjusted under 35 U.S.C. 154(b) by 418 days.

(21) Appl. No.: 17/480,623

(22) Filed: Sep. 21, 2021

(65) Prior Publication Data
US 2023/0089564 A1   Mar. 23, 2023

(51) Int. Cl.
| | | |
|---|---|---|
| G01M 13/04 | (2019.01) | |
| H04N 23/55 | (2023.01) | |
| H04N 23/56 | (2023.01) | |
| H04N 23/58 | (2023.01) | |
| H04N 23/698 | (2023.01) | |

(52) U.S. Cl.
CPC ............ *G01M 13/04* (2013.01); *H04N 23/55* (2023.01); *H04N 23/56* (2023.01); *H04N 23/58* (2023.01); *H04N 23/698* (2023.01)

(58) Field of Classification Search
CPC ......... G05B 23/0283; G06Q 10/06311; G06Q 10/20
See application file for complete search history.

(56) References Cited

U.S. PATENT DOCUMENTS

| | | | |
|---|---|---|---|
| 2011/0049831 A1* | 3/2011 | Lumpkin | F16H 55/171 |
| | | | 474/205 |
| 2011/0235894 A1 | 9/2011 | Bookout et al. | |
| 2014/0260705 A1 | 9/2014 | Kimpel, Jr. et al. | |
| 2018/0149471 A1 | 5/2018 | Lu et al. | |

(Continued)

FOREIGN PATENT DOCUMENTS

| | | |
|---|---|---|
| CN | 102636490 B | 1/2014 |
| CN | 105269387 A * | 1/2016 |

(Continued)

OTHER PUBLICATIONS

Machine translation of KR102067725B1 (Year: 2020).*

(Continued)

*Primary Examiner* — Alexander Satanovsky
*Assistant Examiner* — Sangkyung Lee
(74) *Attorney, Agent, or Firm* — J-TEK LAW PLLC; Scott T. Wakeman; Mark A. Ussai

(57) ABSTRACT

An imaging system is for recording images of a bearing raceway and includes a platform having a surface sized to receive the bearing ring and an optical imager having a lens. A positioner secures the optical imager or a reflector oriented to reflect light to the optical imager lens and locates the optical imager lens or the reflector axially between first and second axial ends of the raceway and facing generally toward the raceway. A motor rotates the platform or the positioner relative to the other one of the platform and the positioner. A processor operates the optical imager and the motor such that the optical imager takes a series of images (Continued)

about the entire perimeter of the bearing raceway. The processor also indexes each image to a separate one of a plurality of arcuate segments of the raceway and constructs a panoramic image of the raceway.

20 Claims, 11 Drawing Sheets

(56) References Cited

U.S. PATENT DOCUMENTS

| | | |
|---|---|---|
| 2022/0198784 A1 | 6/2022 | Toporek et al. |
| 2022/0366558 A1 | 11/2022 | Bufi et al. |
| 2023/0196096 A1 | 6/2023 | Milne et al. |

FOREIGN PATENT DOCUMENTS

| | | | |
|---|---|---|---|
| DE | 102015206613 A1 | 10/2016 | |
| EP | 1972918 A2 * | 9/2008 | ............. F16C 19/52 |
| EP | 2777016 B1 | 3/2019 | |
| JP | 4627596 B2 * | 2/2011 | |
| JP | 2012154639 A * | 8/2012 | |
| KR | 20150021153 A | 3/2015 | |
| KR | 102067725 B1 * | 1/2020 | |
| WO | 2018136769 A1 | 7/2018 | |

OTHER PUBLICATIONS

Machine translation of EP1972918A2 (Year: 2008).*
Machine translation of JP2012154639 (Year: 2012).*
Machine translation of JP4627596B2 (Year: 2011).*
Machine translation of CN105269387A (Year: 2016).*
International Search Report and Written Opinion dispatched Dec. 16, 2022 in related application No. PCT/EP2022/074947.
Shengping Wen, "Vision-Based Surface Inspection System for Bearing Rollers Using Convolutional Neural Networks", Applied Sciences, Published: Dec. 11, 2018 in Appl. Sci. 2018, 8, 2565, www.mdpi.com/journal/applsci, Licensee MDPI, Basel, Switzerland.
Unpublished U.S. Appl. No. 17/643,300.
International Search Report and Written Opinion dispatched Mar. 2, 2023 in related application No. PCT/EP2022/082933.

* cited by examiner

IMAGING SYSTEM FOR RECORDING IMAGES OF BEARING RACEWAYS

BACKGROUND OF THE INVENTION

The present invention relates to imaging systems, and more particularly to imaging systems for recording images of raceways of rolling element bearings.

As is well known, rolling element bearings include an inner ring, an outer ring and a plurality of rolling elements rotatably coupling the inner and outer rings. The rolling elements roll simultaneously upon an inner raceway on the outer surface of the inner ring and on an outer raceway on the inner surface of the outer ring. After a period of use, certain defects to these raceways may occur, such as brinelling, galling, spalling, fretting, etc., which may greatly affect the overall performance of the bearing.

As a result, it is desirable to inspect a sample of bearings in any particular application after a period of time to detect such raceway issues before a potentially catastrophic failure. One inspection method is to record or "take" images (e.g., photos, videos, etc.) of the bearing raceways for both an initial damage assessment and comparison over a period of time to detect wear or damage trends. Typically, the bearing is photographed or otherwise recorded by positioning a camera, microscope or other optical imager facing along the central axis of the bearing ring to take a single image of the entire raceway, which often results in a distorted view of the raceway.

SUMMARY OF THE INVENTION

In one aspect, the present invention is an imaging system for recording images of a bearing raceway, the raceway being formed on an annular bearing ring having a centerline and the raceway having first and second axial ends spaced along the centerline. The imaging system comprises a platform having a surface sized to receive the bearing ring and an optical imager having a lens. A positioner is configured to secure the optical imager or a reflector oriented to reflect light to the optical imager lens and to locate the optical imager lens or the reflector so as to be disposed axially between the first and second axial ends of the raceway and facing generally radially toward the raceway. A motor is configured to rotate one of the platform and the positioner relative to the other one of the platform and the positioner. Further, a processor is configured to operate the optical imager and the motor such that the optical imager takes a series of images about the entire perimeter of the bearing raceway, each image depicting a separate one of a plurality of arcuate segments of the raceway.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
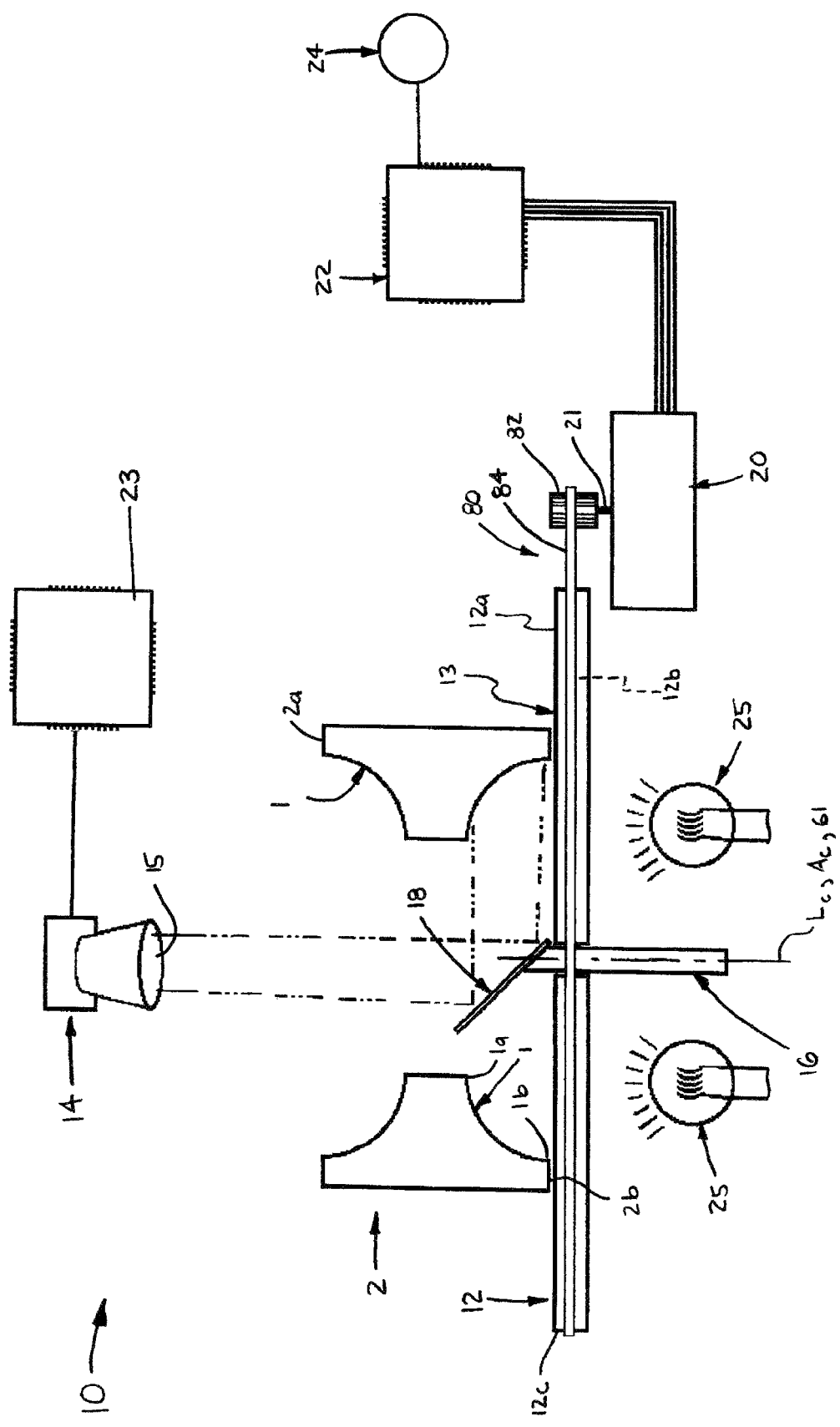
FIG. 1 is a more diagrammatic view of a first construction of the present imaging system, shown with a reflector disposed on a fixed positioner.
Figure 2:
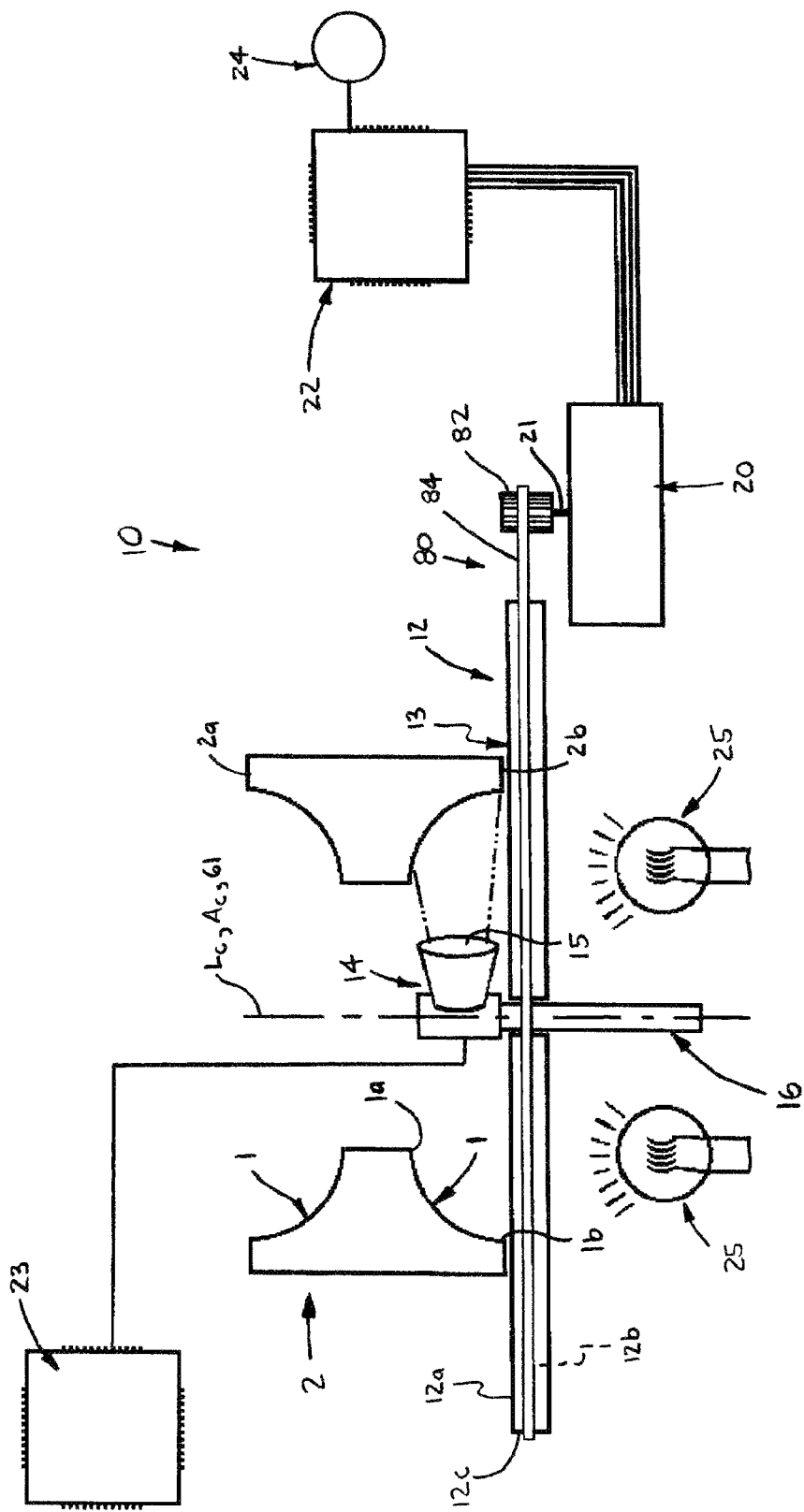
FIG. 2 is a more diagrammatic view of a second construction of the present imaging system, shown with an optical imager disposed on a fixed positioner.

Certain terminology is used in the following description for convenience only and is not limiting. The words "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-12 an imaging system 10 for recording images, preferably digital photographs, of a bearing raceway 1. The raceway 1 is formed on an annular bearing ring 2, which may be an outer ring (FIGS. 1-3, 6) or an inner ring (FIGS. 4 and 5), and has a centerline $L_C$ and opposing axial ends 2a, 2b spaced along the centerline $L_C$. The bearing ring 2 may include only a single raceway 1 or two or more raceways 1 as depicted. Each raceway 1 may be an outer raceway (FIGS. 1-3 and 6) or an inner raceway (FIGS. 4 and 5) and has first and second axial ends 1a, 1b, respectively, spaced along the bearing centerline $L_C$. The imaging system 10 basically comprises a platform 12 with an annular support surface 13 sized to receive the bearing ring 2, an optical imager 14 with a lens 15, a positioner 16 securing the imager 14 or a reflector 18, a motor 20 for rotating the platform 12 or the positioner 16, and a processor 22 electrically connected with the imager 14 and with the motor 20.

More specifically, the platform 12 is preferably generally circular and has opposing first and second radial surfaces 12a, 12b, respectively, and a circular perimeter 12c. The first radial surface 12a of the platform 12 provides the support surface 13 for the bearing ring 2. The optical imager 14 is preferably a digital camera or a microscope incorporating a digital camera, but may be any other optical imaging device or even another type of imaging device, such as for example, an x-ray camera. The positioner 16 is configured to locate the optical imager lens 15 or the reflector 18 so as to be disposed axially between the first and second axial ends 1a, 1b of the raceway 1 and facing generally radially toward the raceway 1. Also, when securing the reflector 18, which may be a mirror, a prism, etc., the positioner 16 retains the reflector 18 oriented to reflect light to the optical imager lens 15, as discussed below. In a preferred construction, the reflector 18 is attached to the positioner 16 and the optical imager 14 is spaced apart from the reflector 18 and the platform 12 along the centerline 61 (described below) of the positioner 16, and is most preferably located vertically above the reflector 18.

Further, the motor 20 is configured to rotate either the platform 12 or the positioner 16 relative to the other one of the platform 12 and the positioner 16, so as to thereby present different arcuate segments S (FIG. 6) of the raceway 1 to the imager 14. Also, the processor 22 is configured to operate both the optical imager 14 and the motor 20 such that the optical imager 14 takes a series of images I (FIG. 7) about the entire perimeter of the bearing raceway 1, each image I depicting a separate one of a plurality of arcuate segments S of the raceway 1. The processor 22 is preferably further configured to index each image I to the corresponding one of the plurality of arcuate segments S of the raceway 1. Thereby, each image I can be matched to or correlated with each specific raceway segment S for analysis of the raceway 1.

Figure 3:
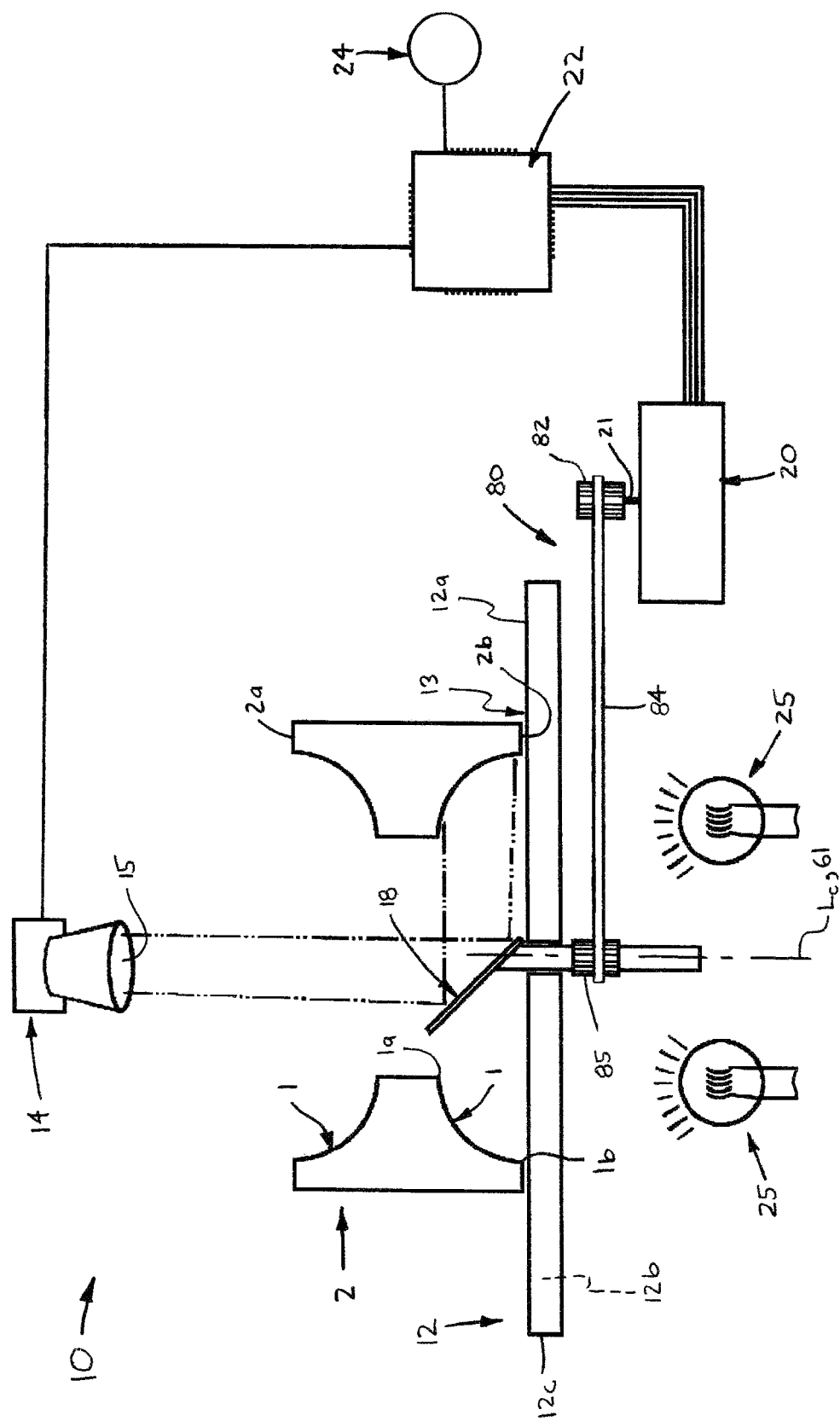
FIG. 3 is a more diagrammatic view of a third construction of the present imaging system, shown with a reflector disposed on a rotatable positioner.
Figure 4:
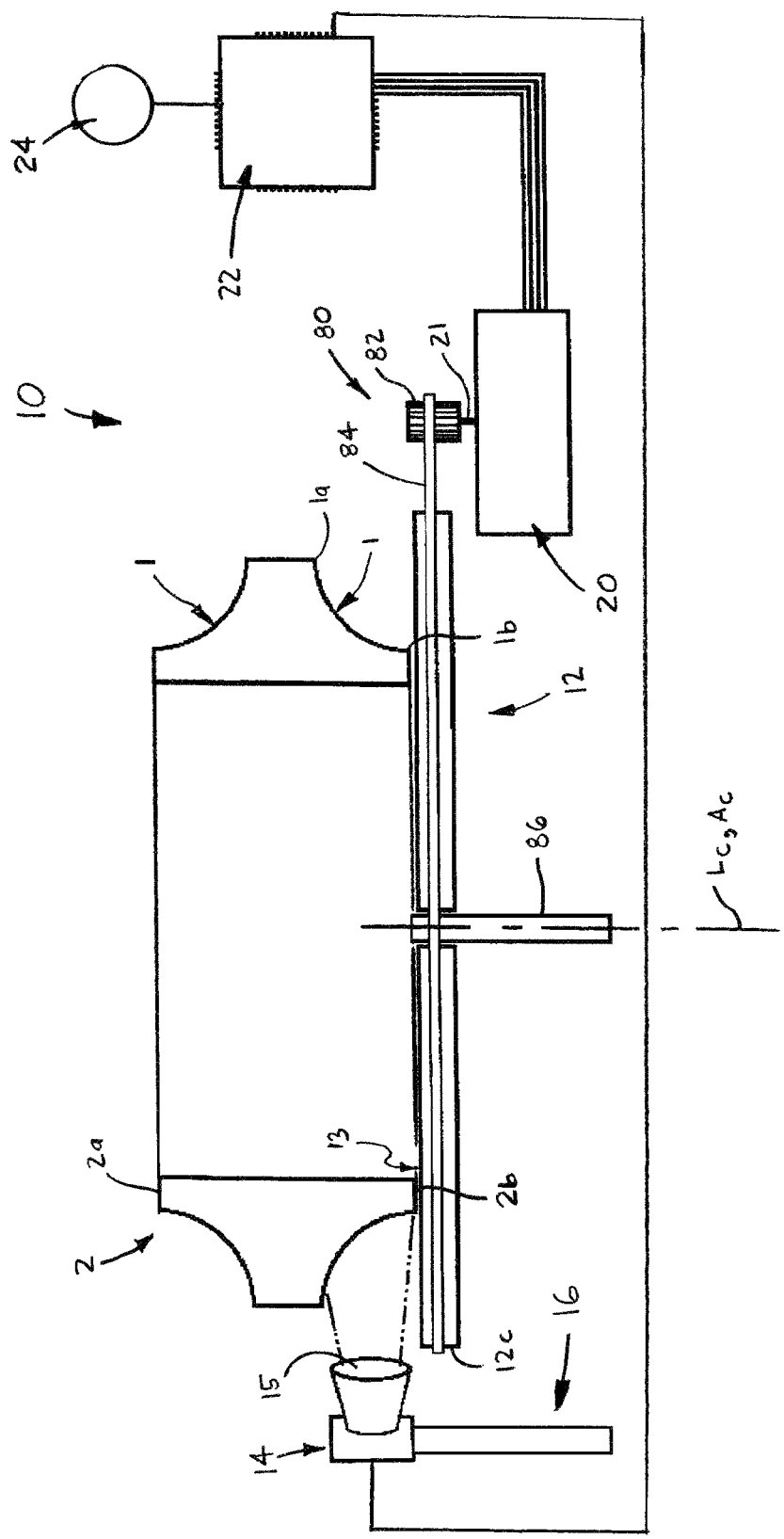
FIG. 4 is more diagrammatic view of a fourth construction of the present imaging system, shown with an optical imager disposed on a fixed positioner located externally of a platform for supporting a bearing being imaged.
Figure 7:
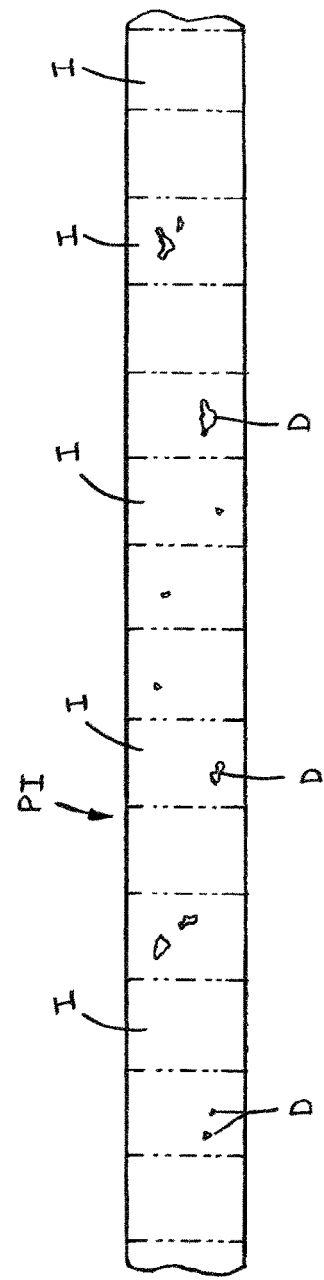
FIG. 7 is a broken-away view of a panoramic image taken of the bearing raceway of FIG. 6.

Preferably, the processor 22, or another, second processor 23 (FIGS. 1 and 2) coupled with the imager 14 (i.e., wired or wirelessly), is configured to receive the images I from the optical imager 14 and to connect the series of images I to form a panoramic image PI of the entire raceway 1, as shown in FIG. 7. That is, a second processor or "computer" 23 is preferably provided for purposes of displaying or printing the images I or PI, which is beyond the capability of the preferred processor 22 as described below, although a single, increased capacity processor 22 may instead be used, as depicted in FIGS. 3 and 4. In any case, the panoramic image PI may be studied to determine the state of wear and/or potential damage to the raceway 1 by viewing any defects D appearing on the raceway 1, as is also indicated in FIG. 7.

Referring to FIGS. 1-5, the motor 20 is preferably a stepper motor having a shaft 21 coupled with the platform 12 or with the positioner 16 and the processor 22. With a stepper motor 20, the processor 22 is configured operate the motor 20 and the optical imager 14 such that the imager 14 takes one image I each time the motor shaft 21 is rotated a predetermined number of steps. In a preferred embodiment in which the motor 20 rotates the platform 12 relative to a fixed positioner 16 and about a central axis $A_C$, the predetermined number of motor shaft steps corresponds to an angular displacement of the platform 12 which moves the bearing ring 2 from a position in which the optical imager 14 or the reflector 18 faces one raceway arcuate segment S to another position in which the optical imager 14/reflector 18 faces an adjacent raceway arcuate segment S. Alternatively, when the motor 20 rotates the positioner 16 relative to a fixed platform 12, the predetermined number of motor shaft steps corresponds to an angular displacement of the positioner 16 which moves the optical imager 14 or the reflector 18 from an angular position facing one raceway arcuate segment S to another angular position facing an adjacent raceway arcuate segment S.

Preferably, the imaging system 10 includes an input member 24 coupled with the processor 22 for inputting the size of a particular bearing 2 being imaged. As such, the processor 22 can determine the number of steps of motor shaft rotation between recording/taking each image I. The input member 24 is preferably a bar code scanner that scans a code on the bearing ring 2, which the processor 22 uses to identify the ring 2 and retrieves dimensional information on the particular bearing ring 2 from files stored on the processor 22.

However, the motor 20 may alternatively be any other appropriate type of motor, such as a servo motor or a conventional alternating current or direct current motor, with appropriate angular position sensors or other sensors providing information on the angular position of the rotating platform 12, or the rotating positioner 16, to the processor 22. Having described the basic components and functions above, these and other parts and assemblies of the present imaging system are described in further detail below.

Still referring to FIGS. 1-5, the imaging system 10 preferably further comprises at least one and preferably a plurality of light sources 25 each spaced from the optical imager 14 and configured to illuminate at least a section of the raceway 1. By being separate of and spaced from the optical imager 14, the light source(s) 25 are capable of fully illuminating at least the segment S of the raceway 1 being imaged at a particular point in time, while eliminating any "black ring" or other shadow interference with the details of the images I often caused by camera mounted-lights. Preferably, the one or more light sources 25 are each an LED panel mounted within a base 26 (described below) and emitting light through transparent sections of a preferred platform 12, as discussed in detail below.

Figure 9:
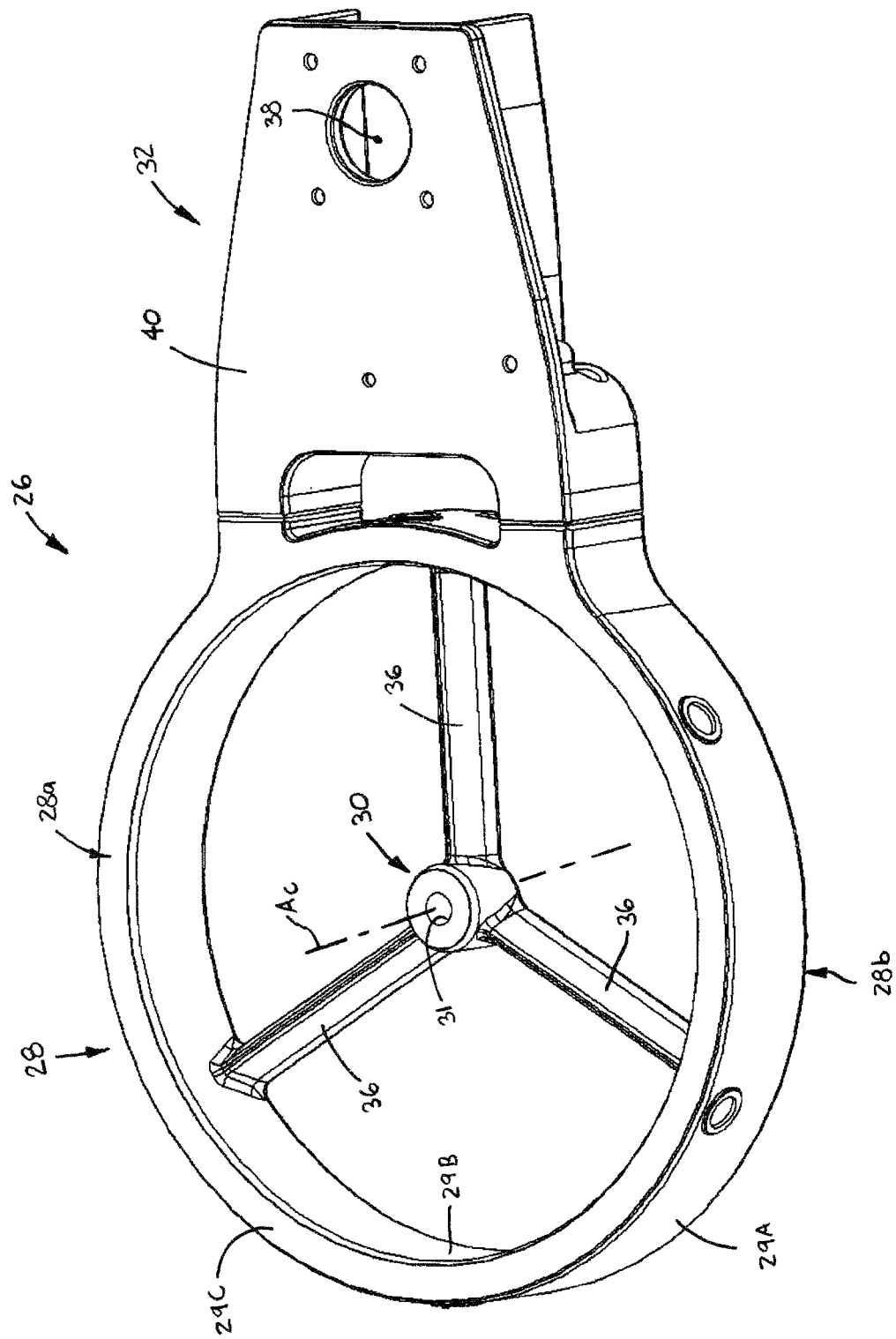
FIG. 9 is a perspective view of a preferred base of the imaging system.
Figure 10:
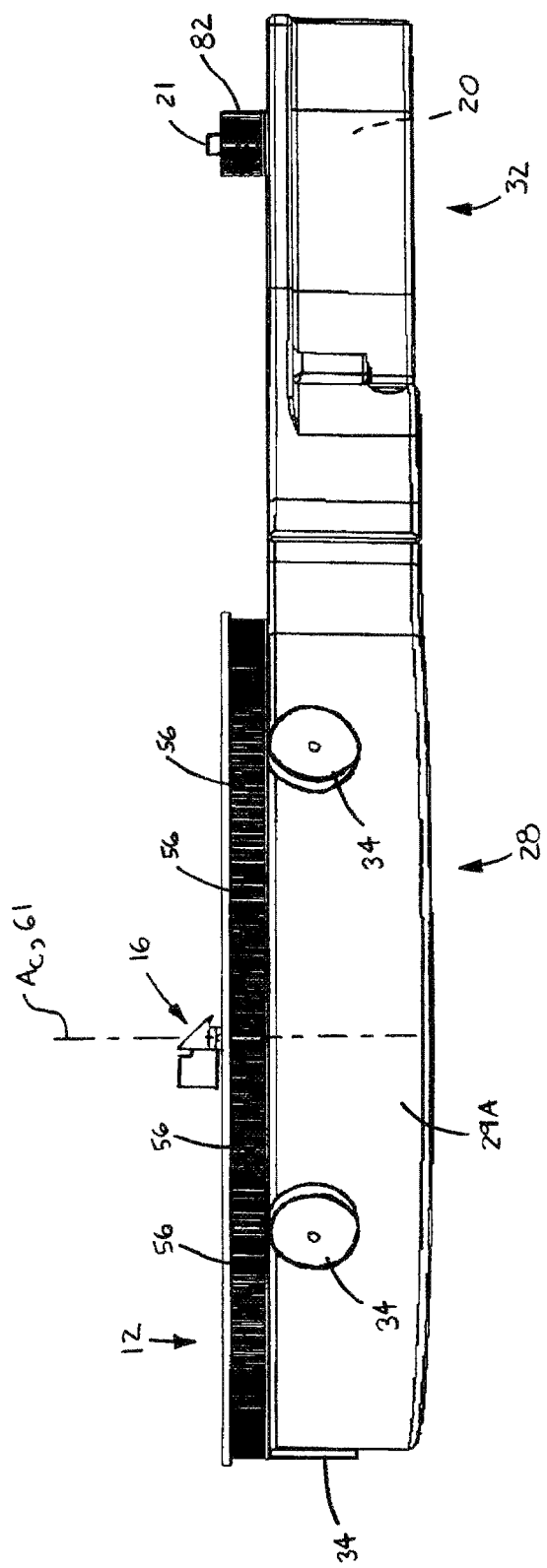
FIG. 10 is a side plan view of the preferred platform mounted on the preferred base and showing a transmission component on a motor shaft.

Referring to FIGS. 9 and 10, the imaging system 10 also preferably further comprises a base 26 including a platform support portion 28 for supporting the platform 12, a central hub portion 30 disposed within the platform support portion 28, and a motor housing portion 32 connected with the platform support portion 28. The platform support portion 28 is generally annular, has opposing upper and lower axial ends 28a, 28b, respectively, and is preferably formed of spaced-apart, radially outer and inner circular walls 29A, 29B, respectively, enclosed by a cover 29C. As shown in FIG. 10, a plurality of rollers 34 are mounted to the outer circular wall 29A such that a portion of each roller 34 extends beyond the upper axial end 28a, the rollers 34 being spaced about the perimeter of the support portion 28. With this structure, the platform 12 is disposed on the plurality of rollers 34 such that the platform 12 is rotatable about the central axis $A_C$, which extends through the central hub portion 30. Preferably, the rollers 34 are each provided by a separate rolling element bearing of any appropriate type, but may alternatively be provided by wheels, casters, or any circular rotatable component.

Further, the central hub portion 30 is preferably connected with the platform support portion 28 by a plurality of elongated members or spokes 36 each extending radially between the hub portion 30 and the inner circular wall 29B of the support portion 28. The hub portion 30 has a central opening 31 for receiving a lower axial end 60b of a shaft 60 of the positioner 16, as described below. Furthermore, the motor housing portion 32 is generally box-like and is preferably connected with the platform support portion 28 by a dove tail connection (not depicted), but may be connected by fasteners, adhesives or any other appropriate means. The motor housing portion 32 has an interior cavity 38 sized to receive the motor 20 and a cover 40 for enclosing the cavity 38.

Preferably, the platform support portion 28, the central hub portion 30, the spokes 36, and the motor housing portion 32 are all formed of a polymeric material, such as for example, nylon, polystyrene, etc., and by means of a 3D printer, but may alternatively be formed of any appropriate material in any appropriate manufacturing process. Further, although the base 26 is preferably formed as described in detail above due to one presently preferred arrangement of the various components of the imaging system 10, the imaging system 10 may include a base 26 with any other appropriate structure or one or more separate base members (none shown) for supporting the various components of the system 10 independently of each other or in appropriate combination(s).

Figure 8:
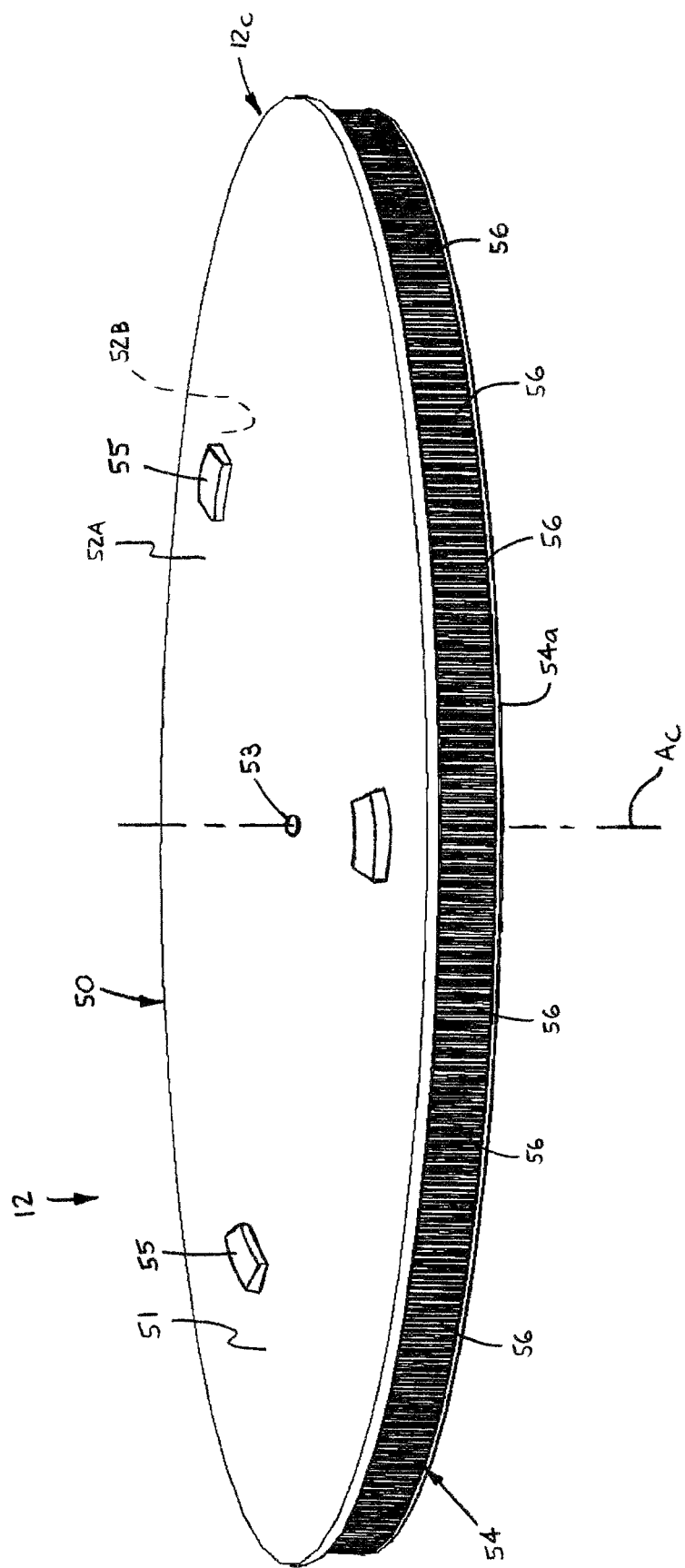
FIG. 8 is a perspective view of a preferred platform.

Referring now to FIGS. 8 and 10, the platform 12 is preferably formed as a circular plate 50 with an outer circular flange 54 and one or more centering members 55 (FIG. 8). Specifically, the plate 50 has opposing upper and lower radial surfaces 52A, 52B and a central opening 53, which is sized to receive a portion of the positioner 16, as described below. The centering member(s) 55 are disposed on the upper radial surface 52A of the plate 50 and is/are configured to center the bearing ring 2 about the central axis $A_C$, so to avoid variations in focus on the raceway 1. Such centering member(s) 55 may be fixed, for example a single circular ring or ridge (not shown), or radially adjustable to accommodate different sized bearing rings 2, such as three or more locator pins (not shown) each disposed within a separate one of a series of radially-spaced openings. Further, the circular flange 54 is integrally formed with the plate 50 and provides the platform outer perimeter 12c. The flange 54 preferably includes a plurality of axial teeth 56 spaced circumferentially about the platform outer perimeter 12c and engageable by a belt 84 of a preferred transmission 80, as described below. Further, a lower end 54a of the circular flange 54 is disposed on the plurality of the rollers 34 so that the platform 12 rotates about the central axis $A_C$ by means of the flange 54 sliding upon the rollers 34 as the teeth 56 are driven by the belt 84, as discussed below.

Preferably, at least a portion (not indicated) of the plate 50 is generally translucent or transparent such that the one or more of the light sources 25 may be disposed within the base 26 beneath the platform 12 and can direct light through the transparent/translucent sections of the platform 12. Further, the circular plate 50 also has an outer annular support surface section 51 sized to receive the bearing ring 2 and providing the annular support surface 13 of the platform 12. As with the base 26, the platform 12 is preferably formed of an appropriate polymeric material and by means of a 3D printer. However, the platform 12 may alternatively be formed of any other appropriate material by any appropriate process, such as a metallic material formed in a stamping operation, etc., particularly when used to provide images of relatively large-sized bearing rings 2. Further, although preferably formed as a circular plate 50 with a toothed radial flange 54, the platform 12 may be formed in any appropriate manner and with any appropriate shape, with or without transmission elements (particularly if non-rotatable), as long as the platform 12 is capable of supporting a bearing ring 2.

Figure 11:
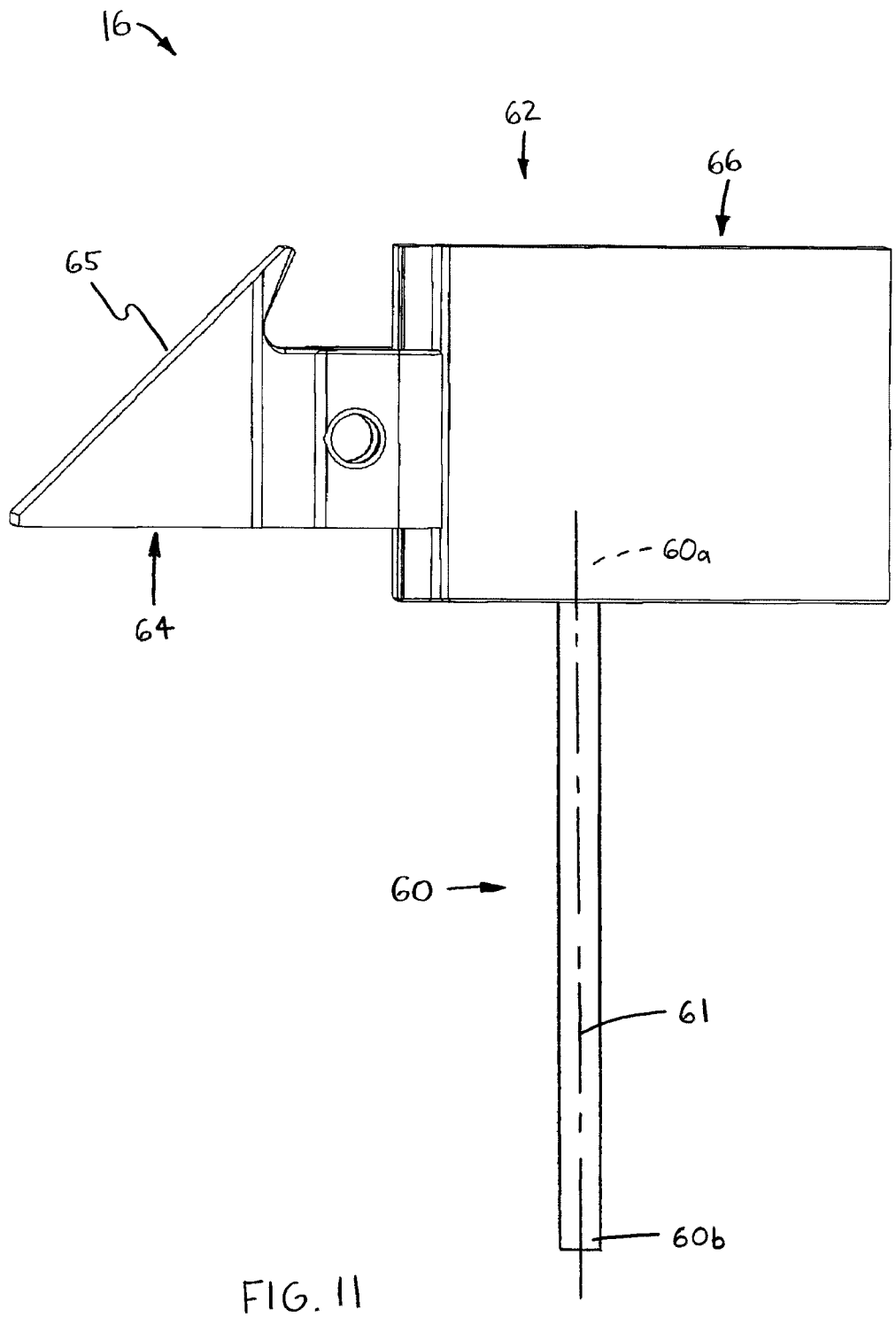
FIG. 11 is side plan view of a preferred positioner.
Figure 12:
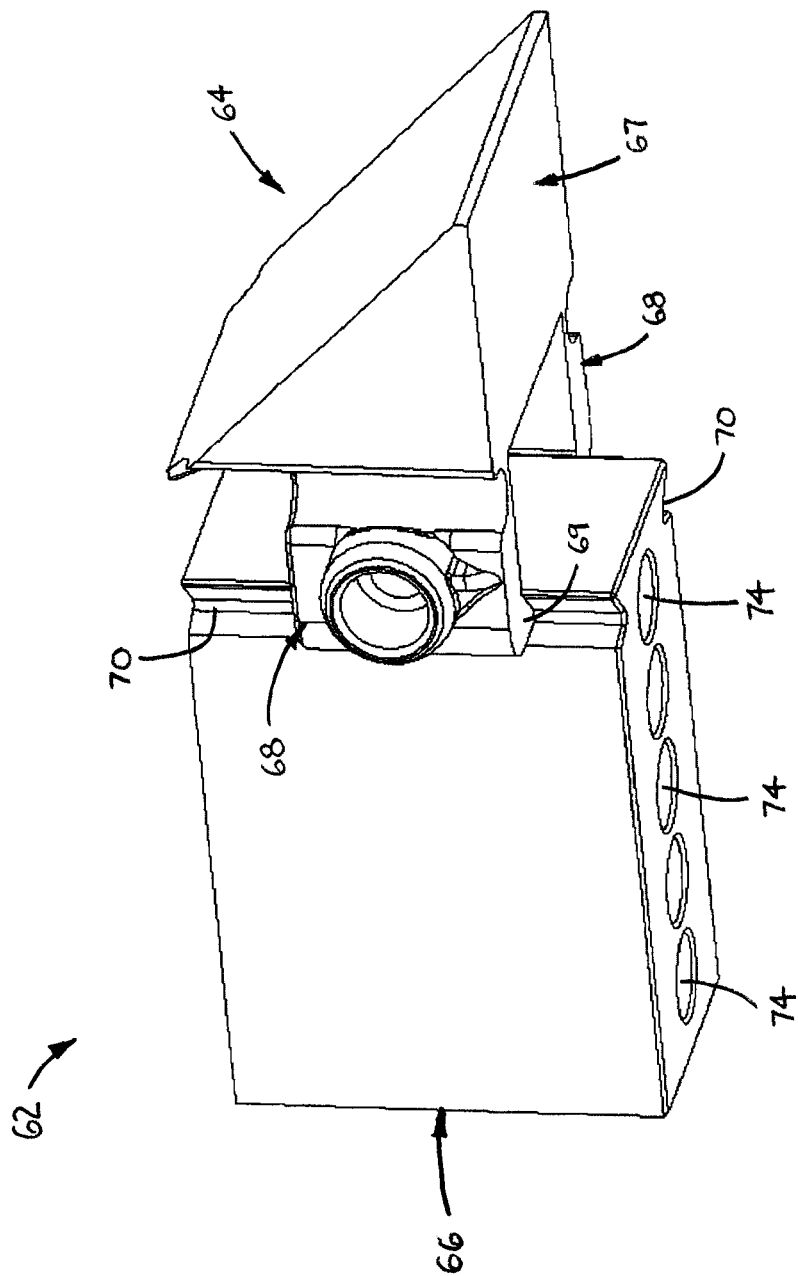
FIG. 12 is a perspective view of a bracket of the positioner of FIG. 11.

As depicted in FIGS. 11 and 12, the positioner 16 preferably includes an elongated shaft 60 and a bracket 62 attached to the shaft 60. Specifically, the shaft 60 has a first, upper end 60a, a second, lower end 60b and a centerline 61 extending between the first and second ends 60a, 60b and collinear with or parallel to the central axis $A_C$ of the preferred platform 12. Preferably, as mentioned above, the second, lower end 60b of the positioner shaft 60 is disposed within the opening 31 of the central hub 30 of the preferred base 26, to thereby connect the positioner 16 to the base 26 with the shaft centerline 61 collinear with the platform central axis $A_C$. Further, the shaft upper end 60a is disposed within or extends through the plate central opening 53 such that the bracket 62 is disposed above the upper radial surface 52A of the preferred plate 50. However, particularly when the imaging system 10 is intended for use in imaging an inner bearing ring 2, the shaft 60 is supported by any appropriate means externally of the platform 12 and thereby also "outside" of the bearing ring 2.

Further, the bracket 62 is mounted on the first, upper end 60a of the shaft 60 and is configured to mount the optical imager 14 or the reflector 18 to the shaft 60. In a presently preferred construction, the bracket 62 is configured to mount the reflector 18 so as to be angled at about forty-five degrees (45°) from horizontal to position the reflector 18 both generally facing the raceway 1 and the imager 14. Thereby, the reflector 18 directs light reflected generally horizontally from the raceway 1 vertically to the photo imager 14 spaced above the reflector 18 as described above. Preferably, the bracket 62 includes a mounting member 64 with an angled mounting surface 65 and a base member 66 attachable to the shaft 60.

More specifically, the mounting member 64 has an upper main portion 67 to which the reflector 18 is attachable or integrally formed (i.e., the main portion 67 is formed of a reflective material) and a pair of horizontal arms 68 each having a dove-tail projection 69 (one shown) receivable in a separate vertically extending dove-tail slot 70 in the base member 66. Thereby, the vertical position of the mounting member 64 relative to the base member 66, and thus the vertical position of the reflector 18 relative to the raceway 1, can be adjusted by sliding the projections 69 within the slots 70. Further, the base member 66 includes a plurality of horizontally-spaced openings 74 each configured to receive the upper end 60a of the shaft 60 to both mount the bracket 62 to the shaft 60 and to establish the horizontal position of the reflector 18 relative to the raceway 1. That is, the horizontal position of the reflector 18 relative to the raceway 1 may be adjusted by inserting the upper end 60a of the shaft 60 in a particular one of the bracket openings 74 which establishes the desired horizontal spacing.

Although preferably formed as described above to mount the reflector 18 to the shaft 60, the bracket 62 may be formed in any appropriate manner to either mount and position the reflector 18, or to mount the optical imager 14 to the shaft 60 and to adjustably position the imager 14 relative to the raceway 1. Further, the shaft 60 and the bracket 62 of the positioner 16 are each preferably formed of an appropriate polymeric material by means of a 3D printer, but may alternatively be formed of any other appropriate material by any appropriate manufacturing process.

Referring to FIGS. 1-5, 8 and 10, the imaging system 10 preferably further comprises a transmission 80 configured to rotatably couple the motor 20 with the platform 12 or with the positioner 16. In the presently preferred construction, the transmission 80 is a belt drive including a pulley 82 disposed on the motor shaft 21, the plurality of teeth 56 (FIGS. 8 and 10) of the preferred platform 12, and a toothed belt 84 extending about the pulley 82 and about the plurality of teeth 56 of the platform 12. As such, angular displacement of the motor shaft 21 is transmitted through the belt 84 to affect a corresponding angular displacement of the platform 12 about the central axis $A_C$.

Figure 5:
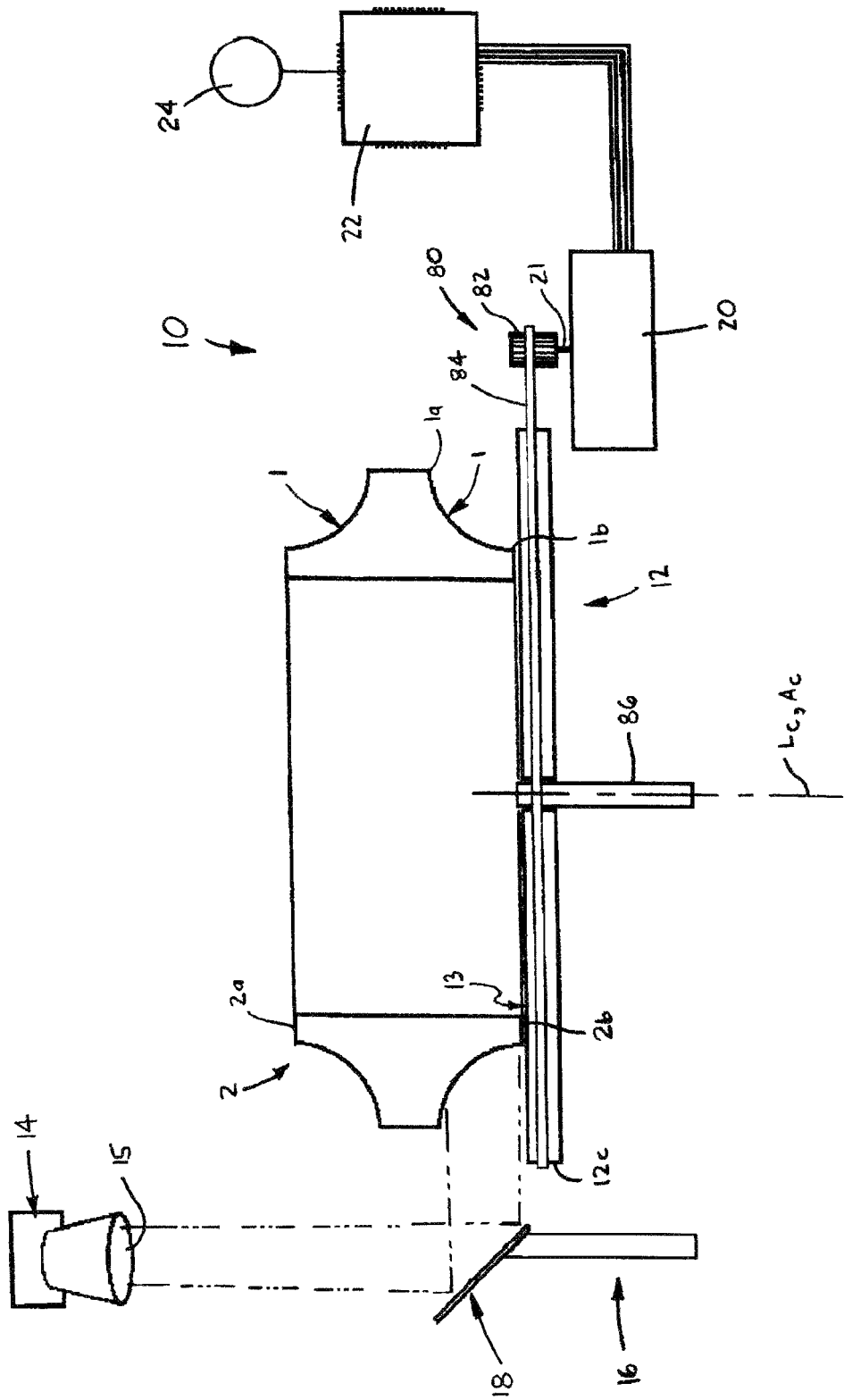
FIG. 5 is more diagrammatic view of a fifth construction of the present imaging system, shown with a reflector disposed on a fixed positioner located externally of a platform for supporting a bearing being imaged.
Figure 6:
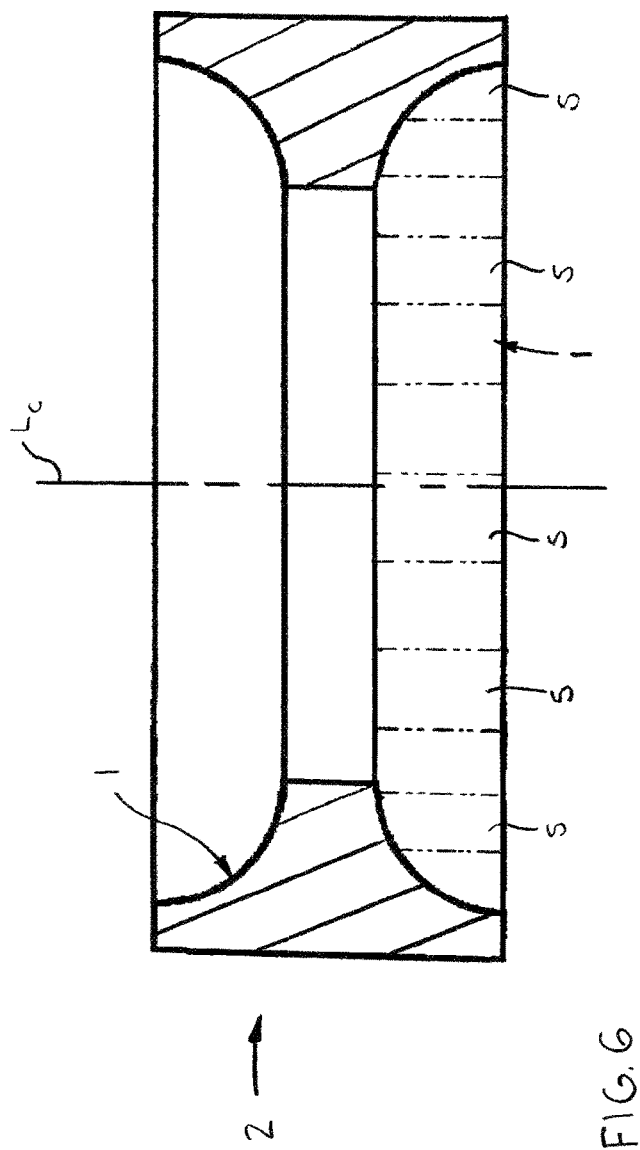
FIG. 6 is an axial cross-sectional view of an exemplary bearing ring, indicating separate raceway segments being imaged by the optical imager.

When the imaging system 10 is used to record images of an inner bearing ring 2 as depicted in FIGS. 4 and 5, the same transmission 80 may be used to angularly displace the platform 12 about a fixed central shaft 86, with the positioner 16 being located externally of and adjacent to the outer perimeter 12c of the platform 12. Further, when the positioner 16 is rotatable about the central axis $A_C$ within a fixed platform 12, the transmission 80 includes one or more components, such as a pulley 85 disposed on or integrally formed with the positioner 16 and engaged by the motor 20, for example through the pulley 82 and the belt 84, as shown in FIG. 3. Although a belt-and-pulley transmission is presently preferred, the transmission 80 may be formed in any other appropriate manner which enables precise, controlled rotation of the platform 12 or the positioner 16, such as a gear train, a chain-and-sprocket drive, etc.

Preferably, the various components of the transmission 80, the motor 20 and the processor 22 are all commercially available components. Most preferably, the motor 20 is a Nema stepper motor and the processor 22 is provided by an Arduino™ microcontroller, but may be provided by any other appropriate commercially available motor and processor.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. An imaging system for recording images of a bearing raceway, the raceway being formed on an annular bearing ring having a centerline and the raceway having first and second axial ends spaced along the centerline, the imaging system comprising:
a platform having a surface sized to receive the bearing ring, a central opening and a central vertical axis extending through the opening;
an optical imager having a lens;
a positioner configured to secure the optical imager or a reflector oriented to reflect light to the optical imager lens and to locate the optical imager lens or the reflector so as to be disposed axially between the first and second axial ends of the raceway and facing generally radially toward the raceway, the positioner including a shaft extending through the central opening of the platform and along the central vertical axis, the optical imager or the reflector being mounted to the shaft;
a motor configured to rotate one of the platform and the positioner relative to the other one of the platform and the positioner; and
a processor configured to operate the optical imager and the motor such that the optical imager takes a series of images about the entire perimeter of the bearing raceway, each image depicting a separate one of a plurality of arcuate segments of the raceway.

2. The imaging system as recited in claim 1 wherein the processor or another processor is configured to receive the images from the optical imager and to connect the series of images to form a panoramic image of the entire raceway.

3. The imaging system as recited in claim 1 further comprising at least one light source spaced from the optical imager and configured to illuminate at least a segment of the raceway being imaged.

4. The imaging system as recited in claim 1 wherein the optical imager is a digital camera or a microscope.

5. The imaging system as recited in claim 1 further comprising a transmission configured to rotatably couple the motor with the platform or with the positioner.

6. The imaging system as recited in claim 1 wherein:
the motor is a stepper motor having a shaft coupled with the platform or with the positioner; and
the processor is configured to operate the optical imager such that one image is taken each time the motor shaft rotates through a predetermined number of steps corresponding to one of:
an angular displacement of the positioner which moves the optical imager or the reflector from a position facing one raceway arcuate segment to another position facing an adjacent raceway arcuate segment; and
an angular displacement of the platform which moves the bearing from a position in which the optical imager or the reflector faces one raceway arcuate segment to another position in which the optical imager or the reflector faces an adjacent raceway arcuate segment.

7. The imaging system as recited in claim 1 wherein:
the motor is coupled with the platform and is configured to rotate the platform about the central axis or the motor is coupled with the positioner and is configured to rotate the positioner about the central axis.

8. The imaging system as recited in claim 1 wherein the positioner shaft has first and second ends and a centerline extending between the first and second ends and collinear with or parallel to the centerline of the platform and the positioner further includes a bracket attached to the first end of the shaft and configured to mount the optical imager or the reflector to the shaft.

9. The imaging system as recited in claim 8 wherein the reflector is attached to the bracket and the optical imager is spaced apart from the reflector and the platform along the centerline of the positioner shaft.

10. The imaging system as recited in claim 1 further comprising a base including:
an annular portion with opposing axial ends, a plurality of rollers mounted to the wall such that a portion of each roller extends beyond one axial end, the platform being disposed on the plurality of rollers;

a central hub portion disposed within the annular portion and having a central opening, the positioner shaft has an upper axial end extending through the platform and a lower axial end disposed within the central hub portion of the base; and a motor housing portion connected with the annular portion and including an interior cavity, the motor being disposed within the interior cavity.

11. An imaging system for recording images of a bearing inner raceway, the raceway being formed on a bearing outer ring having a centerline and the inner raceway having first and second axial ends spaced along the centerline, the imaging system comprising:

a platform having a surface sized to receive the bearing outer ring, a central bore and a central axis extending through the bore and collinear with the bearing centerline;

an optical imager having a lens;

a positioner disposed within the bore of the platform so as to extend along the central axis, the positioner being configured to secure the optical imager or a reflector oriented to reflect light to the optical imager lens and to locate the optical imager lens or the reflector so as to be disposed axially between the first and second axial ends of the raceway and facing generally radially toward the raceway;

a motor configured to rotate the platform about the central axis and relative to the positioner; and a processor configured to operate the optical imager and the motor such that the optical imager takes a series of images about the entire perimeter of the bearing raceway, each image depicting a separate one of a plurality of arcuate segments of the raceway.

12. The imaging system as recited in claim 11 wherein the processor or another processor is further configured to receive the images from the optical imager and to connect the series of images to form a panoramic image of the entire raceway.

13. The imaging system as recited in claim 11 further comprising at least one light source spaced from the optical imager and configured to illuminate at least the arcuate segment of the raceway being imaged.

14. The imaging system as recited in claim 11 further comprising a transmission configured to rotatably couple the motor with the platform.

15. The imaging system as recited in claim 14 wherein:

the platform includes a circular outer perimeter and a plurality of teeth spaced circumferentially about the outer perimeter of the platform; and the transmission includes a pulley disposed on a shaft of the motor and a belt extending about the pulley and about the plurality of teeth of the platform.

16. The imaging system as recited in claim 11 wherein:

the motor is a stepper motor having a shaft coupled with the platform or the positioner; and the processor is configured to operate the optical imager such that one image is taken each time the motor shaft rotates through a predetermined number of steps corresponding to an angular displacement of the positioner which moves the optical imager or the reflector from a position facing one raceway arcuate segment to another position facing an adjacent raceway arcuate segment.

17. The imaging system as recited in claim 11 wherein the positioner includes:

a shaft having first and second ends and a centerline extending between the first and second ends and collinear with or parallel to the centerline of the platform; and a bracket attached to the first end of the shaft and configured to mount the optical imager or the reflector to the shaft.

18. The imaging system as recited in claim 17 wherein the reflector is attached to the bracket and the optical imager is spaced apart from the reflector and the platform along the centerline of the positioner shaft.

19. The imaging system as recited in claim 11 further comprising a base including:

an annular portion with opposing axial ends, a plurality of rollers mounted to the wall such that a portion of each roller extends beyond one axial end, the platform being disposed on the plurality of rollers;

a central hub portion disposed within the annular portion and having a central opening, the positioner including a shaft with an upper axial end extending through the platform and a lower axial end disposed within the central hub portion of the base; and a motor housing portion connected with the annular portion and including an interior cavity, the motor being disposed within the interior cavity.

20. An imaging system for recording images of a bearing raceway, the raceway being formed on an annular bearing ring having a centerline and the raceway having first and second axial ends spaced along the centerline, the imaging system comprising:

a platform having a surface sized to receive the bearing ring and a central vertical axis;

an optical imager having a lens;

a positioner configured to secure the optical imager or a reflector oriented to reflect light to the optical imager lens and to locate the optical imager lens or the reflector so as to be disposed axially between the first and second axial ends of the raceway and facing generally radially toward the raceway;

a motor spaced horizontally apart from the central vertical axis of the platform and configured to rotate one of the platform and the positioner relative to the other one of the platform and the positioner, the motor having a shaft and a transmission connecting the motor shaft with the positioner or with the platform; and a processor configured to operate the optical imager and the motor such that the optical imager takes a series of images about the entire perimeter of the bearing raceway, each image depicting a separate one of a plurality of arcuate segments of the raceway.

* * * * *